(12) United States Patent
Murao (10) Patent No.: US 12,466,509 B2
(45) Date of Patent: Nov. 11, 2025

(54) FRONT WHEEL STEERING MECHANISM IN CENTER HUB STEERING

(71) Applicant: MURAO DESIGN WORKS LLC, Kawasaki (JP)

(72) Inventor: Takeshi Murao, Kawasaki (JP)

( * ) Notice: Subject to any disclaimer, the term of this patent is extended or adjusted under 35 U.S.C. 154(b) by 845 days.

(21) Appl. No.: 17/754,470

(22) PCT Filed: Oct. 4, 2019

(86) PCT No.: PCT/JP2019/039302
§ 371 (c)(1),
(2) Date: Jan. 20, 2023

(87) PCT Pub. No.: WO2021/064983
PCT Pub. Date: Apr. 8, 2021

(65) Prior Publication Data
US 2023/0192226 A1    Jun. 22, 2023

(51) Int. Cl.
  *B62K 21/00*   (2006.01)
  *B60B 1/02*    (2006.01)
  *B60B 27/00*   (2006.01)
  *B60B 27/02*   (2006.01)

(52) U.S. Cl.
  CPC .............. *B62K 21/005* (2013.01); *B60B 1/02* (2013.01); *B60B 27/0047* (2013.01); *B60B 27/02* (2013.01)

(58) Field of Classification Search
  CPC .................................................. B62K 21/005
  See application file for complete search history.

(56) References Cited

U.S. PATENT DOCUMENTS

| 5,133,223 A | * | 7/1992 | Morri | B62K 21/02 180/219 |
| 6,349,784 B1 | * | 2/2002 | van der Heide | B62K 25/24 280/277 |
| 2015/0307152 A1 | | 10/2015 | Van Steenwyk | |

FOREIGN PATENT DOCUMENTS

| DE | 19728665 A1 * | 1/1999 | ............. B62K 25/00 |
| JP | H0485101 A | 3/1992 | |
| JP | 2002500133 A | 1/2002 | |
| WO | 2015033492 A1 | 3/2015 | |

OTHER PUBLICATIONS

World Intellectual Property Office (WIPO), International Search Report, Jan. 7, 2020.

* cited by examiner

*Primary Examiner* — Kevin Hurley
(74) *Attorney, Agent, or Firm* — CIONCA IP Law P.C.

(57) ABSTRACT

A front wheel steering mechanism in a center hub steering system. The mechanism comprising an inner wheel hub, an outer wheel hub, paired rolling bearings positioned between these inner and outer wheel hubs, a front shaft, a hub steering bracket attached to outside of the front shaft, and a hub steering shaft. The inner wheel hub is attached to the hub steering bracket so as to freely rotate about the hub steering shaft as an axial center. The outer wheel hub is configured of a left outer wheel hub and a right outer wheel hub. These left and right outer wheel hubs are rigidly coupled or are coupled via a plurality of wire spokes to a rim.

4 Claims, 9 Drawing Sheets

FRONT WHEEL STEERING MECHANISM IN CENTER HUB STEERING

TECHNICAL FIELD

The present invention relates to a front wheel steering mechanism in a center hub steering system.

BACKGROUND ART

As a steering mechanism and a shock absorbing mechanism of a two-wheel vehicle such as a bicycle or motorcycle, a system called a telescopic fork system has been known. In this system, steering is performed by a steering shaft above the front wheel, with a front shaft held from both sides by two expandable shafts. Since this system is formed of a simple structure and can be inexpensively manufactured, the system has been most generally adopted as a steering mechanism of a two-wheel vehicle.

However, the telescopic fork system has the following drawbacks. First, there is a problem in which, when the front fork is contracted (nose-dived) at the time of braking, the caster angle increases to decrease the trail, thereby changing steering characteristics. There is also a problem in which since the front fork is present between the main body frame and the front wheel, the connection distance between the front and rear wheel shafts is long and the system is weak in external force in a lateral direction, decreasing stiffness of the entire two-wheel vehicle.

As front wheel steering mechanisms for solving the drawbacks of the telescopic fork system as described above, various systems have been studied and contrived so far. As one of these, a system called a center hub steering system has been conventionally known. Basic technical details of that system are disclosed in, for example, Patent Literature 1 (Japanese Unexamined Patent Application Publication No. 3-208785).

According to the center hub steering system, advantages can be enjoyed in that the trail is not decreased and steering characteristics are not changed at the time of braking. Also, since the connection distance between the front and rear wheel shafts can be shortened compared with a two-wheel vehicle adopting the telescopic fork system, the stiffness of the entire two-wheel vehicle can be enhanced. As having these advantages, the structure of the center hub steering system is slightly complex more than that of the telescopic fork system, and manufacturing cost slightly increases. Even so, the center hub steering system has been continuously adopted as ever today.

However, the center hub steering system also has problems to be solved. In this system, there is a problem in which, since the hub steering shaft (steering shaft) is positioned inside the inner wheel hub, if an offset (a distance between the front shaft and the hub steering shaft) is tried to be sufficiently ensured in consideration of steering performance and so forth, the outer diameter of the hub bearing is increased, thereby increasing bearing friction and degrading rolling performance and fuel efficiency and, at the worst, causing bearing burning. By contrast, if this problem is tried to be avoided, it is required to decrease the outer diameter of the hub bearing, thereby posing also a problem in which desired steering performance and offset cannot be ensured.

A technique for solving the problems as described above has also been conceived already. For example, disclosed in Patent Literature 2 (Japanese Unexamined Patent Application Publication (Translation of PCT Application) No. 2002-500133) is a technique regarding the center hub steering system. Here, to ensure an offset, a structure is such that the hub steering shaft is at the rear of the front shaft and at a position a predetermined distance away from the front shaft. According to the structure, even if desired steering performance and so forth are ensured with an offset being sufficiently taken, the outer diameter of the hub bearing is not increased. Thus, an advantage can be enjoyed in that bearing friction does not increase and the problem of bearing burning does not occur.

However, while the idea of the technique disclosed in Patent Literature 2 is excellent itself, the structure is required to be such that the hub main body (sign 3 of Patent Literature 2) is accommodated inside a center space part of the front wheel as a rigid body. However, since the opening of the center space part is smaller than the hub main body, it is impossible, in view of manufacture, to accommodate the hub main body inside that center space part. Moreover, in Patent Literature 2, manufacturing methods and so forth capable of solving this are neither disclosed nor suggested.

In view of these circumstances, the inventor of the present application has diligently studied methods and means capable of solving the above-described problems. As a result, the inventor of the present application has obtained findings that the problems as described above can be solved by configuring an outer wheel hub by using two hubs that are independent to left and right, and resulted in creation of the present invention.

Note that, before applying the present invention, the inventor and the applicant of the present application researched previous patent literatures and so forth and found the following literatures regarding the front wheel steering mechanism in the center hub steering system but did not find a patent literature in which the technical idea and so forth according to the present invention are described in detail.

CITATION LIST

Patent Literatures

[Patent Literature 1] Japanese Unexamined Patent Application Publication No. 3-208785
[Patent Literature 2] Japanese Unexamined Patent Application Publication (Translation of PCT Application) No. 2002-500133

SUMMARY OF INVENTION

Technical Problem

The present invention relates to a front wheel steering mechanism in a center hub steering system and, in particular, has an object of providing a front wheel steering mechanism in which a front wheel can be suitably and achievably attached, even if a sufficient offset is taken, optimum geometry is set, and desired steering performance and so forth are ensured. It is also an object to provide a front wheel steering mechanism in which rolling performance and fuel efficiency can be dramatically improved without increasing the outer diameter of the hub bearing or increasing bearing friction. Furthermore, in the present invention, it is also an object to provide a light-weight front wheel steering mechanism in a center hub steering system applicable also to bicycles by configuring the front wheel also by using a wire spoke wheel.

Solution to Problem

As means for this, a front wheel steering mechanism according to the present invention is characterized to include an inner wheel hub, an outer wheel hub, paired rolling bearings positioned between these inner and outer wheel hubs, a front shaft, a hub steering bracket attached to outside of the front shaft, and a hub steering shaft, wherein the inner wheel hub is provided with a first hub-steering-shaft hole for having the hub steering shaft inserted thereinto, at rear of the front shaft and at a position a predetermined distance away from the front shaft, the hub steering bracket is provided also with a second hub-steering-shaft hole for having the hub steering shaft inserted thereinto, the hub steering shaft penetrates through the first and the second hub-steering-shaft holes, the inner wheel hub is attached to the hub steering bracket so as to freely rotate about the hub steering shaft as an axial center, and the outer wheel hub is configured of a left outer wheel hub and a right outer wheel hub separable to left and right along a rotation axis direction, and these left outer wheel hub and right outer wheel hub are rigidly coupled.

Also, a front wheel steering mechanism according to the present invention is characterized to include an inner wheel hub, an outer wheel hub, paired rolling bearings positioned between these inner and outer wheel hubs, a front shaft, a hub steering bracket attached to outside of the front shaft, and a hub steering shaft, wherein the inner wheel hub is provided with a first hub-steering-shaft hole for having the hub steering shaft inserted thereinto, at rear of the front shaft and at a position a predetermined distance away from the front shaft, the hub steering bracket is provided also with a second hub-steering-shaft hole for having the hub steering shaft inserted thereinto, the hub steering shaft penetrates through the first and the second hub-steering-shaft holes, the inner wheel hub is attached to the hub steering bracket so as to freely rotate about the hub steering shaft as an axial center, and the outer wheel hub is configured of a left outer wheel hub and a right outer wheel hub each independently formed, and these left and right outer wheel hubs are coupled via a plurality of wire spokes to a rim.

Furthermore, the front wheel steering mechanism according to the present invention is characterized in that, in the paired rolling bearings, balls or tapered rollers as component members are positioned in a single row.

Advantageous Effects of Invention

According to the present invention, a front wheel steering mechanism can be provided in which a front wheel can be suitably and achievably attached, even if a sufficient offset is taken, optimum geometry is set, and desired steering performance and so forth are ensured. Also, a front wheel steering mechanism can also be provided in which rolling performance and fuel efficiency are dramatically improved without increasing the outer diameter of the hub bearing or increasing bearing friction. Furthermore, in the present invention, a light-weight front wheel steering mechanism in a center hub steering system applicable also to bicycles can be provided by configuring the front wheel by using a wire spoke wheel.

DESCRIPTION OF EMBODIMENTS

Figure 1:
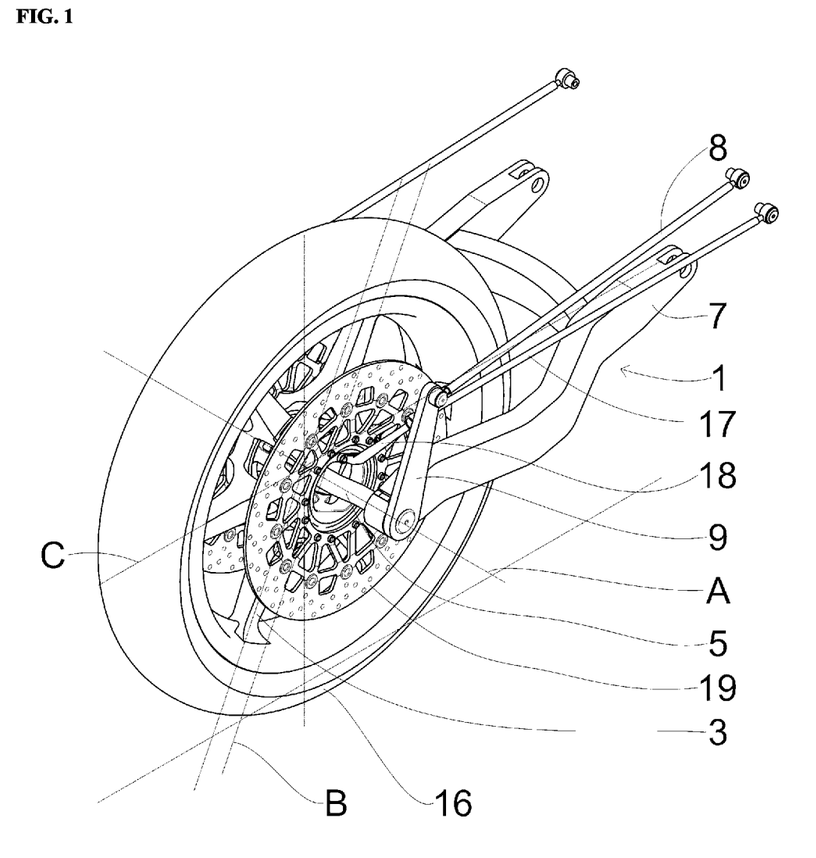
FIG. 1 is a drawing depicting a front wheel steering mechanism 1 according to a first embodiment of the present invention.
Figure 2:
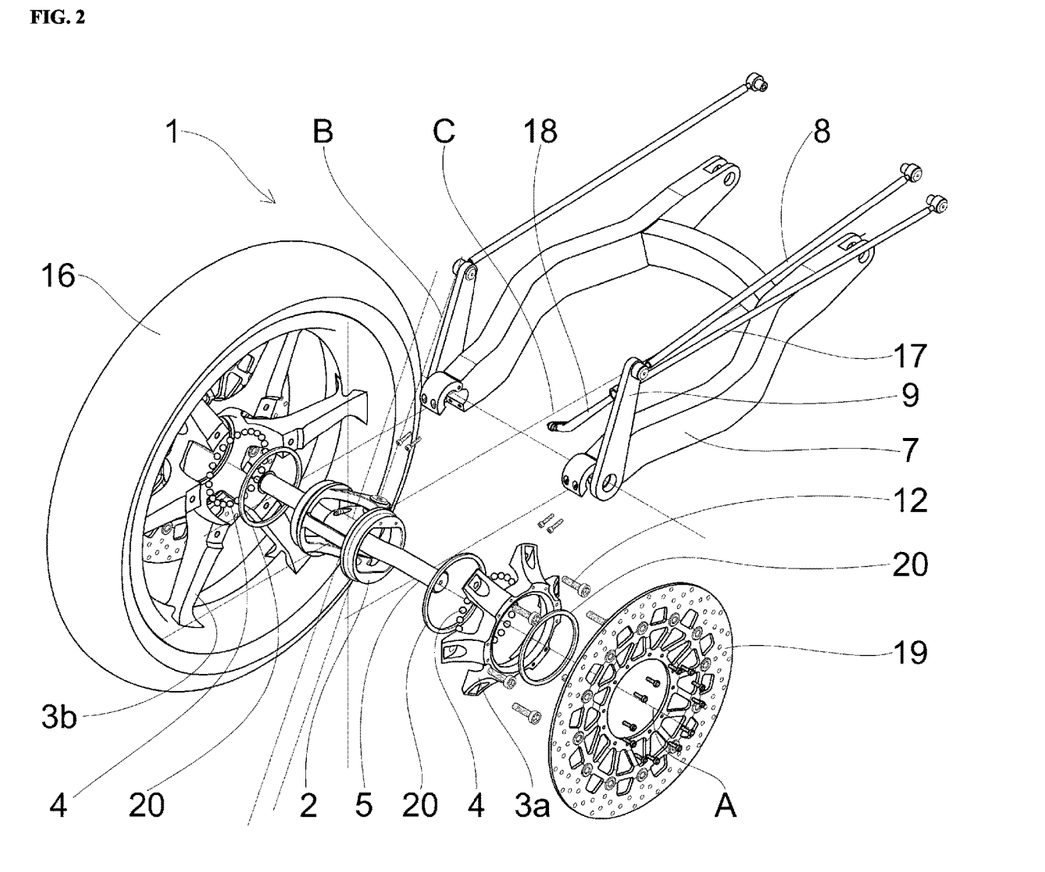
FIG. 2 is a drawing depicting the front wheel steering mechanism 1 according to the first embodiment of the present invention.
Figure 3:
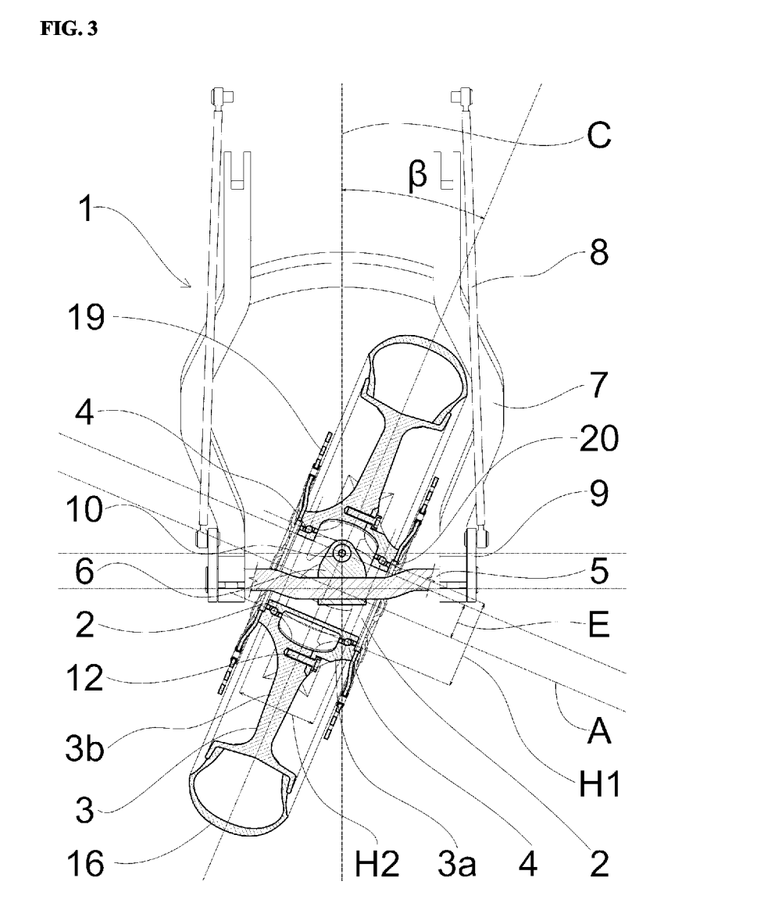
FIG. 3 is a drawing depicting the front wheel steering mechanism 1 according to the first embodiment of the present invention.

Described below are embodiments for implementing a front wheel steering mechanism in a center hub steering system according to the present invention. Note that in the present invention, each of front, rear, left, and right directions is described with reference to a traveling direction of a vehicle having the front wheel steering mechanism according to the present invention. Also, details of alphanumeric signs in each drawing are as follows.

α: caster angle
β: steering angle
A: rotation axis
B: steering axis
C: vehicle-body center axis
D: trail
E: offset
H1: hub bearing diameter
H2: hub bearing spacing
S1: steer bearing diameter
S2: steer bearing spacing FIG. 1 to FIG. 3 depict a basic configuration of the front wheel steering mechanism 1 according to the present embodiment (first embodiment). In these drawings, the front wheel steering mechanism 1 applied to a motorcycle is depicted, and the traveling direction (front direction) of the motorcycle is on the left side in FIG. 1 and FIG. 2 and on the under side in FIG. 3.

In these drawings, 2 denotes an inner wheel hub; 3 (3a, 3b) denotes an outer wheel hub; 4, 4 denote paired rolling bearings positioned between the inner wheel hub 2 and the outer wheel hub 3; and 5 denotes a front shaft. Also in FIG. 3, 6 denotes a hub steering bracket attached to the outside of the front shaft 5; and 10 denotes a hub steering shaft.

Furthermore, in FIG. 1 to FIG. 3, 7 depicts a front swing arm; 8 denotes an upper rod; 9 denotes a link arm; 16 denotes a tire; 17 denotes a steering rod; 18 denotes a steering arm; 19 denotes a disc brake; and 20 denotes an oil seal. Note that the functions and structures of the members with signs 7 to 9 and signs 16 to 20 are similar to those adopted in a conventional center hub steering system and are thus not particularly described below.

Figure 4:
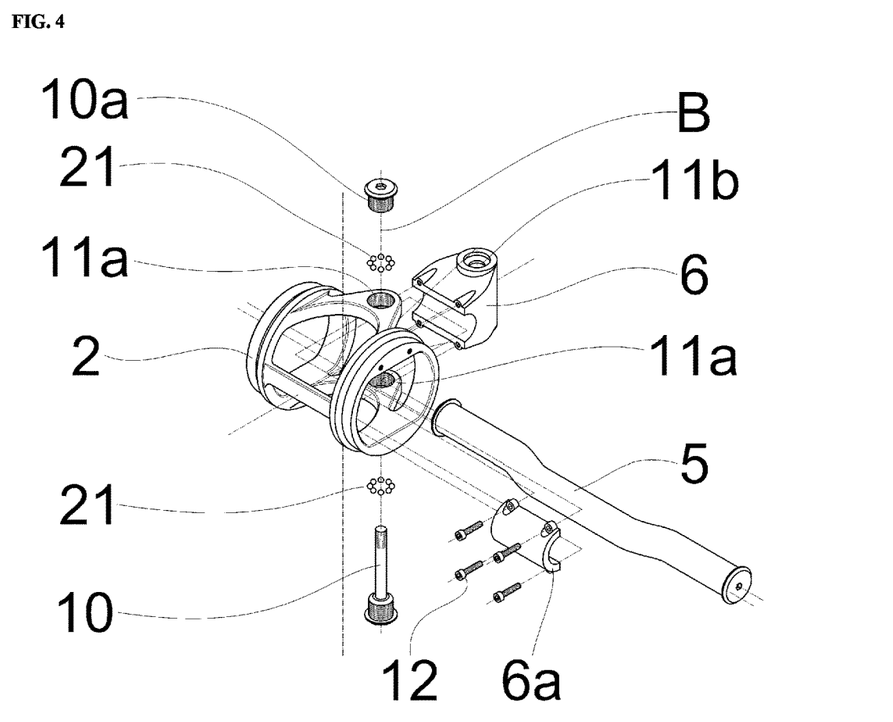
FIG. 4 is a drawing depicting the front wheel steering mechanism 1 according to the first embodiment of the present invention.
Figure 5:
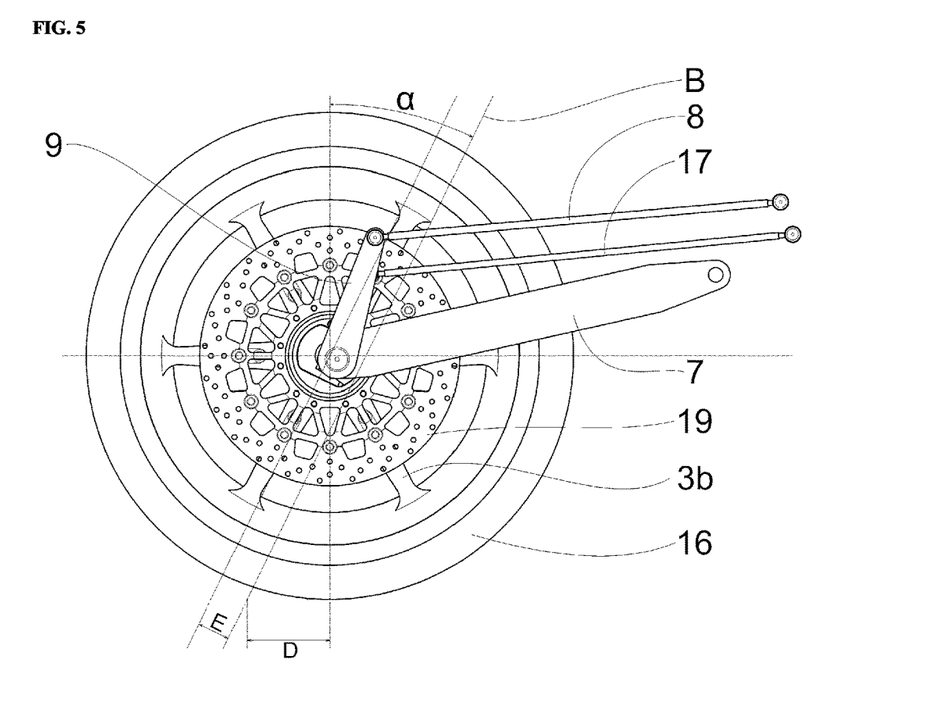
FIG. 5 is a drawing depicting the front wheel steering mechanism 1 according to the first embodiment of the present invention.

The inner wheel hub 2 is provided with, as depicted in FIG. 4, two first hub-steering-shaft holes 11a for having the hub steering shaft 10 inserted thereinto, at the rear of the front shaft 5 and at a position a predetermined distance away from the front shaft 5 (offset position).

Also, the hub steering bracket 6 is provided also with a second hub-steering-shaft hole 11b for having the hub steering shaft 10 inserted thereinto. As depicted in the drawing, the hub steering shaft 10 is inserted so as to penetrate through the two first hub-steering-shaft holes 11a and the second hub-steering-shaft hole 11b positioned between these two first hub-steering-shaft holes 11a, and is fixed with a nut 10a. With this, the inner wheel hub 2 is attached to the hub steering bracket 6 so as to freely rotate about the hub steering shaft 10 as an axial center.

Figure 6:
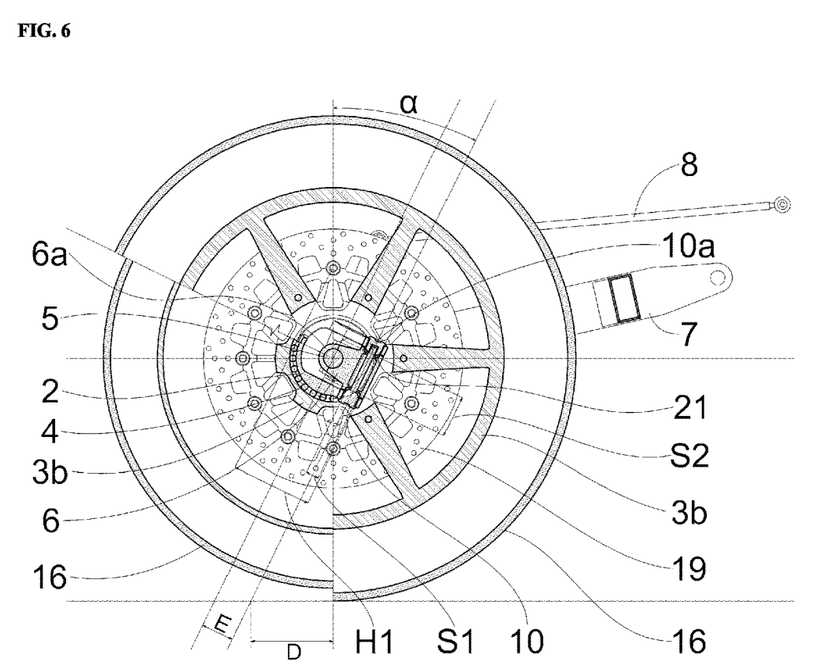
FIG. 6 is a drawing depicting the front wheel steering mechanism 1 according to the first embodiment of the present invention.

Note that, here, to allow the inner wheel hub 2 to smoothly rotate, two steer bearings 21, 21 are preferably positioned between the inner wheel hub 2 and a flange part of the hub steering shaft 10 and between the inner wheel hub 2 and a flange part of the nut 10a. In this case, as a diameter S1 of the steer bearings 21 (refer to FIG. 6) is smaller, an effect capable of reducing bearing friction is obtained. Also, as a space S2 (refer to FIG. 6) between the two steer bearings 21 is larger, the moment applied from the front wheel to the hub steering shaft 10 at the time of acceleration or deceleration of the vehicle body is smaller. Thus, an effect capable of lightening a radial (diameter direction) load to the steer bearings 21 is also obtained.

Furthermore, to the hub steering bracket 6, as depicted in FIG. 4, a cover 6a is fixed with a bolt 12. With the configuration in which the front shaft 5 is inserted between these hub steering bracket 6 and cover 6a, the hub steering bracket 6 is configured to be attached to the outside of the front shaft 5.

The outer wheel hub 3 is configured of, as depicted in FIG. 2 and FIG. 3, a left outer wheel hub 3a and a right outer wheel hub 3b separable to left and right along a rotation axis direction of the front wheel. These left outer wheel hub 3a and right outer wheel hub 3b are rigidly coupled with the bolt 12. Note that rigid coupling herein may be performed with fastening means other than a bolt.

Since the front wheel steering mechanism 1 in the center hub steering system according to the present embodiment is configured as described above, even if the hub steering shaft 10 is at the rear of the front shaft 5 and at a position a predetermined distance away from the front shaft 5 (offset position), the front wheel of the motorcycle or the like can be suitably and achievably attached. Also, with this, a front wheel steering mechanism can be provided in which rolling performance and fuel efficiency can be dramatically improved without increasing the outer diameter of the hub bearing or increasing bearing friction.

Next, a second embodiment of the present invention is described. A front wheel steering mechanism 1 in this second embodiment is significantly different from one in the first embodiment described above in that the front wheel is configured of a wire spoke wheel.

Figure 7:
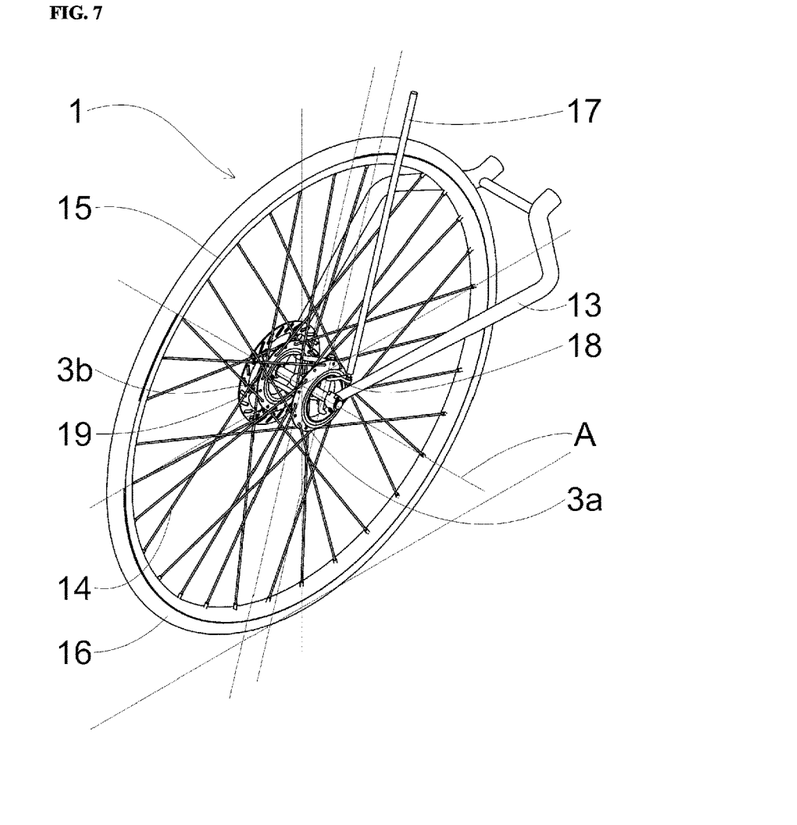
FIG. 7 is a drawing depicting a front wheel steering mechanism 1 according to a second embodiment of the present invention.
Figure 8:
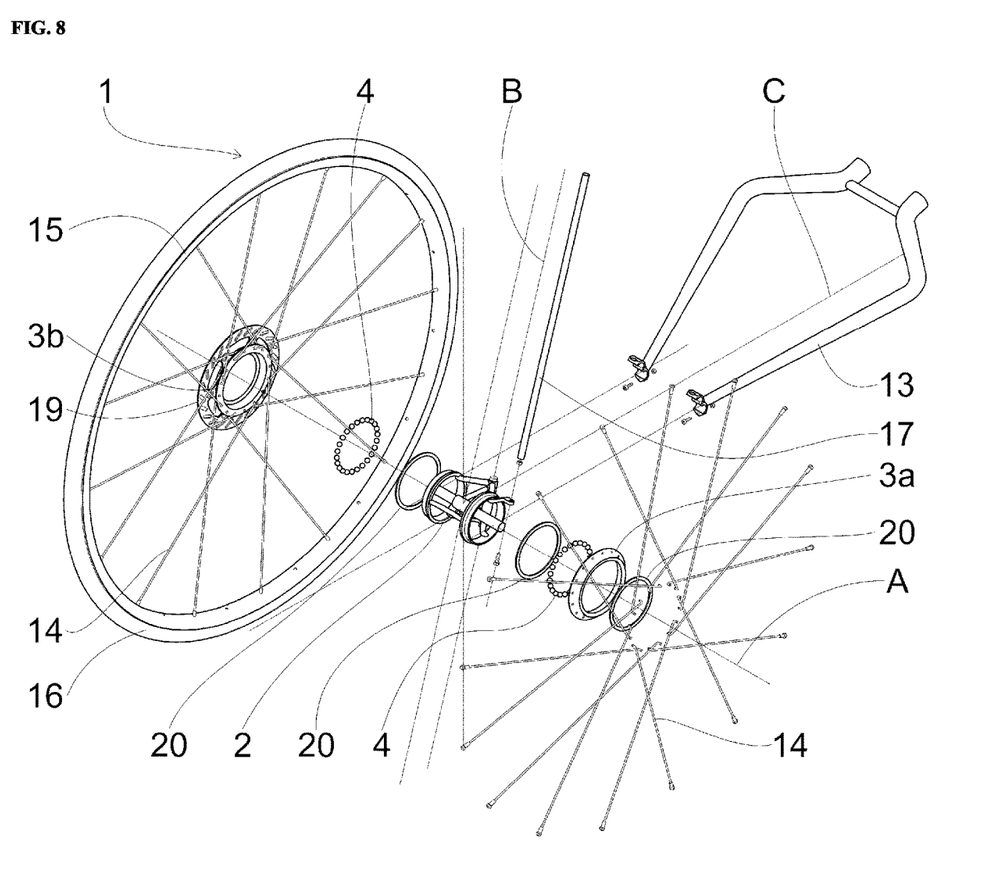
FIG. 8 is a drawing depicting the front wheel steering mechanism 1 according to the second embodiment of the present invention.
Figure 9:
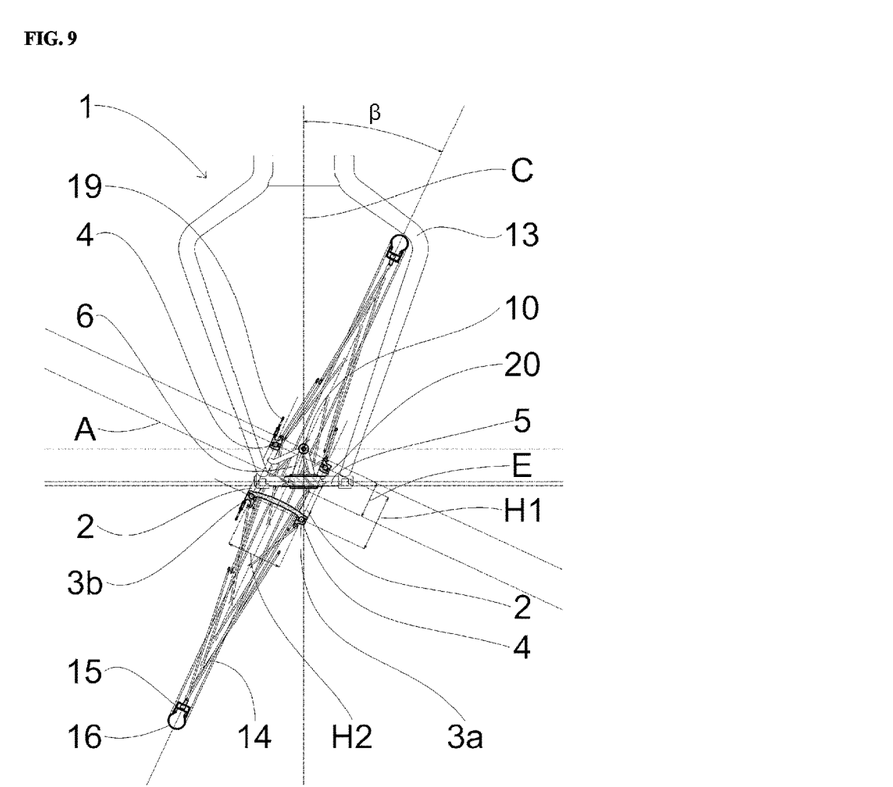
FIG. 9 is a drawing depicting the front wheel steering mechanism 1 according to the second embodiment of the present invention.

FIG. 7 to FIG. 9 depict a basic configuration of the front wheel steering mechanism 1 according to the present embodiment. In these drawings, the front wheel steering mechanism 1 applied to a bicycle is depicted, and the traveling direction (front direction) of the bicycle is on the left side in FIG. 7 and FIG. 8 and on the under side in FIG. 9.

Also in these drawings, 2 denotes an inner wheel hub; 3a denotes a left outer wheel hub; 3b denotes right outer wheel hub; 4, 4 denote paired rolling bearings positioned between the inner wheel hub 2 and the left outer wheel hub 3a and between the inner wheel hub 2 and the right outer wheel hub 3b, respectively; 5 denotes a front shaft; 6 denotes a hub steering bracket attached to the outside of the front shaft 5; and 10 denotes a hub steering shaft. Also in these drawings, 13 denotes a front horizontal fork. Furthermore, as with the description in the first embodiment, 16 denotes a tire; 17 denotes a steering rod; 18 denotes a steering arm; 19 denotes a disc brake; and 20 denotes an oil seal.

Figure 10:
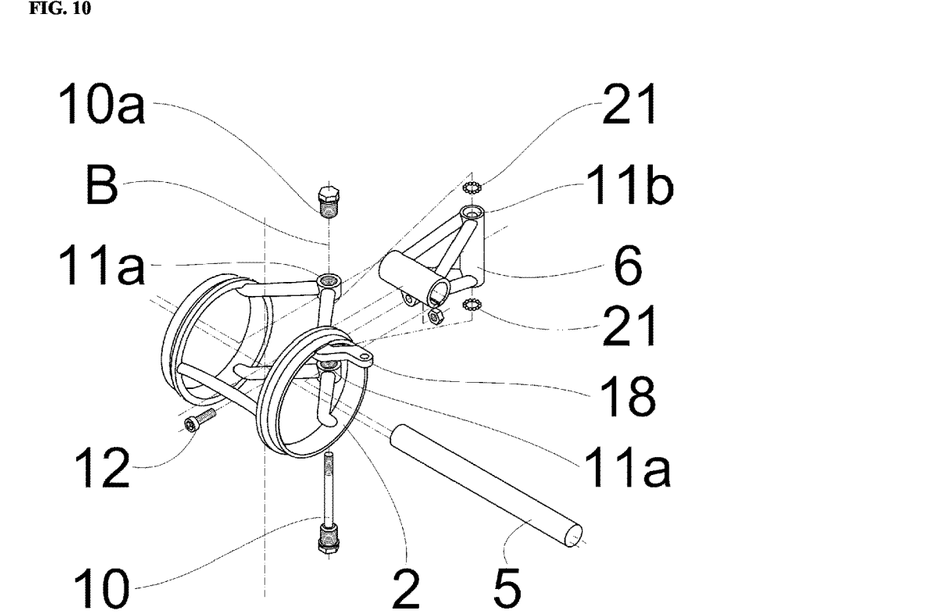
FIG. 10 is a drawing depicting the front wheel steering mechanism 1 according to the second embodiment of the present invention.
Figure 11:
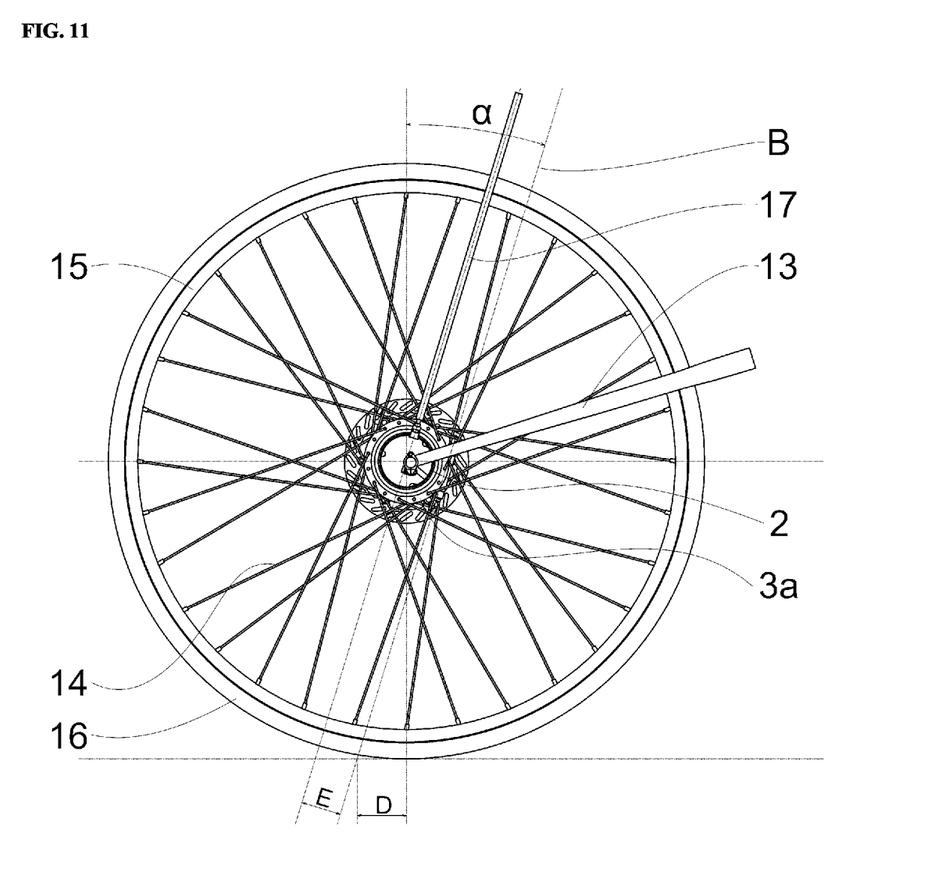
FIG. 11 is a drawing depicting the front wheel steering mechanism 1 according to the second embodiment of the present invention.

The inner wheel hub 2 is provided with, as depicted in FIG. 10, two first hub-steering-shaft holes 11a for having the hub steering shaft 10 inserted thereinto, at the rear of the front shaft 5 and at a position a predetermined distance away from the front shaft 5 (offset position).

Also, the hub steering bracket 6 is provided also with a second hub-steering-shaft hole 11b for having the hub steering shaft 10 inserted thereinto. As depicted in the drawing, the hub steering shaft 10 is inserted so as to penetrate through the two first hub-steering-shaft holes 11a and the second hub-steering-shaft hole 11b positioned between these two first hub-steering-shaft holes 11a, and is fixed with a nut 10a. With this, the inner wheel hub 2 is attached to the hub steering bracket 6 so as to freely rotate about the hub steering shaft 10 as an axial center.

Figure 12:
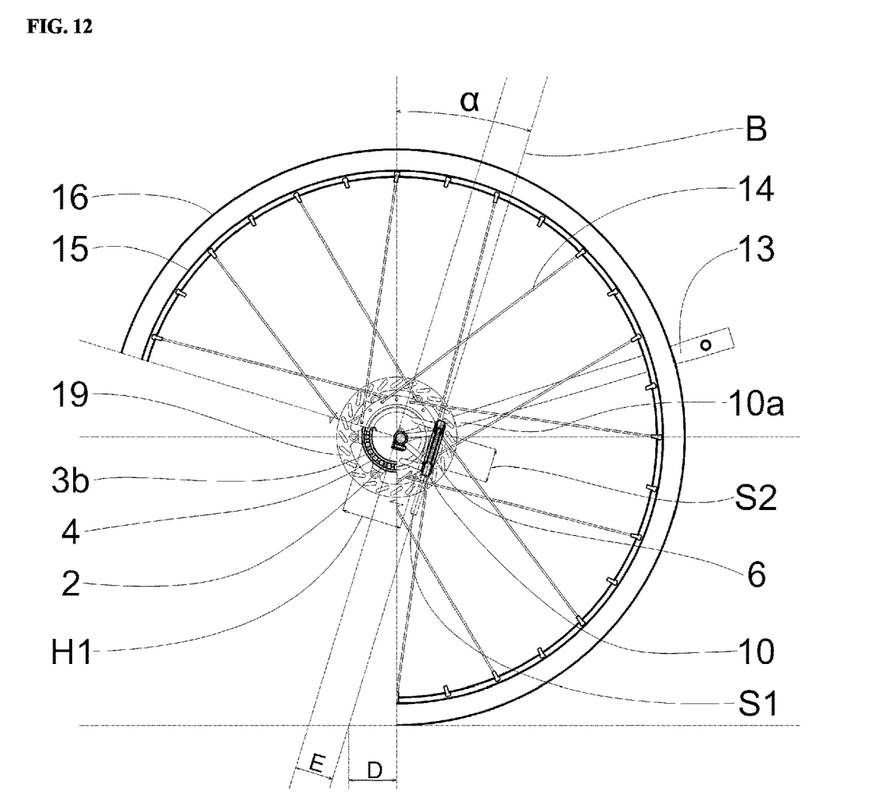
FIG. 12 is a drawing depicting the front wheel steering mechanism 1 according to the second embodiment of the present invention.

Note that, here, to allow the inner wheel hub 2 to smoothly rotate, the two steer bearings 21, 21 are preferably positioned at upper and lower ends, respectively, of the second hub-steering-shaft hole 11b. In this case, as a diameter S1 of the steer bearings 21 (refer to FIG. 12) is smaller, an effect capable of reducing bearing friction is obtained. Also, as a space S2 (refer to FIG. 12) between the two steer bearings 21 is larger, the moment applied from the front wheel to the hub steering shaft 10 at the time of acceleration or deceleration of the vehicle body is smaller. Thus, an effect capable of lightening a radial (diameter direction) load to the steer bearings 21 is also obtained.

Furthermore, the hub steering bracket 6 is configured, as depicted in FIG. 10, to have the front shaft 5 inserted therein at a position in front of the second hub-steering-shaft hole 11b. With this, the hub steering bracket 6 is configured to be attached to the outside of the front shaft 5.

The outer wheel hub 3 is configured of, as depicted in FIG. 8, a left outer wheel hub 3a and a right outer wheel hub 3b each independently formed, and these left outer wheel hub 3a and right outer wheel hub 3b are coupled, as depicted in FIG. 7 to FIG. 9, via a plurality of wire spokes 14 to a rim 15.

Since the front wheel steering mechanism 1 in the center hub steering system according to the present embodiment is configured as described above, even if the hub steering shaft 10 is at the rear of the front shaft 5 and at a position a predetermined distance away from the front shaft 5 (offset position), the front wheel of the bicycle or the like can be suitably and achievably attached. Also, with this, a front wheel steering mechanism can be provided in which rolling performance and fuel efficiency (when adopted into a motorcycle or the like) can be dramatically improved without increasing the outer diameter of the hub bearing or increasing bearing friction.

Furthermore, according to the present embodiment, the front wheel structure of a two-wheel vehicle can be configured of a wire spoke wheel. Thus, a light-weight front wheel structure can be provided in which shock can be absorbed in the wheel itself.

Figure 13:
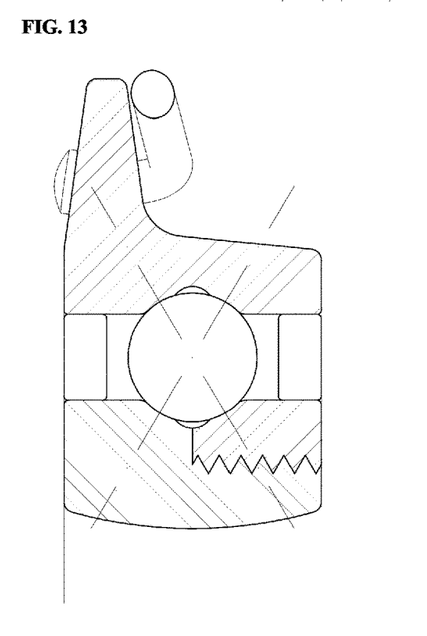
FIG. 13 is a schematic drawing depicting a four-point-contact ball bearing.

Note that while balls are adopted as component members of the rolling bearing 4 in each embodiment described above, tapered rollers may be adopted instead. These balls or tapered rollers are preferably positioned in a single row. This is because, with the single row, space can be saved and bearing friction can further be lightened. Also in this case, if a four-point-contact ball bearing as depicted in FIG. 13 is adopted as the rolling bearing 4, the bearing can be made resistant to a load to an axial direction. Furthermore, even before the wire spoke is tensioned, the inner wheel hub 2 and the left outer wheel hub 3a, and the inner wheel hub 2 and the right outer wheel hub 3b can be respectively fixed, also allowing these to be easily assembled.

Note that, as a matter of course, the front wheel steering mechanism according to the present invention can be applied to any vehicle which can adopt the center hub steering system, such as not only a two-wheel vehicle such as a bicycle and motorcycles but also a vehicle with three or more wheels.

INDUSTRIAL APPLICABILITY

As has been described above, according to the present invention, in a vehicle adopting the center hub steering system, a front wheel steering mechanism can be provided in which a front wheel can be suitably and achievably attached, even if a sufficient offset is taken, optimum geometry is set, and desired steering performance and so forth are ensured. Also, a front wheel steering mechanism can be provided in which rolling performance and fuel efficiency can be dramatically improved without increasing the outer diameter of the hub bearing or increasing bearing friction. Furthermore, in the present invention, a light-weight front wheel steering mechanism in a center hub steering system applicable also to a bicycle can also be provided by configuring the front wheel by using a wire spoke wheel.

Note that since the front wheel steering mechanism according to the present invention is adopted in the center hub steering system, according to the front wheel steering mechanism in accordance with the present invention, all advantages the center hub steering system has can be naturally enjoyed.

REFERENCE SIGNS LIST

1: front wheel steering mechanism
2: inner wheel hub
3: outer wheel hub
3a: left outer wheel hub
3b: right outer wheel hub
4: rolling bearing
5: front shaft
6: hub steering bracket
6a: cover
7: front swing arm
8: upper rod
9: link arm
10: hub steering shaft
10a: nut
11a: first hub-steering-shaft hole
11b: second hub-steering-shaft hole
12: bolt
13: front horizontal fork
14: wire spoke
15: rim
16: tire
17: steering rod
18: steering arm
19: disc brake
20: oil seal
21: steer bearing
$\alpha$: caster angle
$\beta$: steering angle
A: rotation axis
B: steering axis
C: vehicle-body center axis
D: trail
E: offset
H1: hub bearing diameter
H2: hub bearing spacing
S1: steer bearing diameter
S2: steer bearing spacing

The invention claimed is:

1. A front wheel steering mechanism in a center hub steering system, the mechanism comprising an inner wheel hub, an outer wheel hub, paired rolling bearings positioned between these inner and outer wheel hubs, a front shaft, a hub steering bracket attached to outside of the front shaft, and a hub steering shaft, wherein
   the inner wheel hub is provided with a first hub-steering-shaft hole for having the hub steering shaft inserted thereinto, at rear of the front shaft and at a position a predetermined distance away from the front shaft,
   the hub steering bracket is provided also with a second hub-steering-shaft hole for having the hub steering shaft inserted thereinto,
   the hub steering shaft penetrates through the first and the second hub-steering-shaft holes,
   the inner wheel hub is attached to the hub steering bracket so as to freely rotate about the hub steering shaft as an axial center, and
   the outer wheel hub is configured of a left outer wheel hub and a right outer wheel hub separable to left and right along a rotation axis direction, and these left outer wheel hub and right outer wheel hub are rigidly coupled.

2. The front wheel steering mechanism according to claim 1, wherein
   in the paired rolling bearings, balls or tapered rollers as component members are positioned in a single row.

3. A front wheel steering mechanism in a center hub steering system, the mechanism comprising an inner wheel hub, an outer wheel hub, paired rolling bearings positioned between these inner and outer wheel hubs, a front shaft, a hub steering bracket attached to outside of the front shaft, and a hub steering shaft, wherein
   the inner wheel hub is provided with a first hub-steering-shaft hole for having the hub steering shaft inserted thereinto, at rear of the front shaft and at a position a predetermined distance away from the front shaft,
   the hub steering bracket is provided also with a second hub-steering-shaft hole for having the hub steering shaft inserted thereinto,
   the hub steering shaft penetrates through the first and the second hub-steering-shaft holes,
   the inner wheel hub is attached to the hub steering bracket so as to freely rotate about the hub steering shaft as an axial center, and the outer wheel hub is configured of a left outer wheel hub and a right outer wheel hub each independently formed, and these left and right outer wheel hubs are coupled via a plurality of wire spokes to a rim.

4. The front wheel steering mechanism according to claim 3, wherein
in the paired rolling bearings, balls or tapered rollers as component members are positioned in a single row.

\* \* \* \* \*